March 16, 1948.  E. ENGEL ET AL  2,437,945
PRESS TOOL
Filed July 23, 1946  2 Sheets-Sheet 1
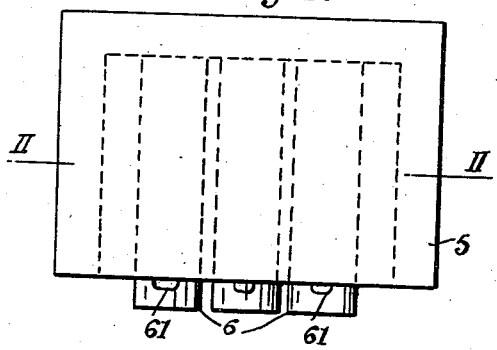
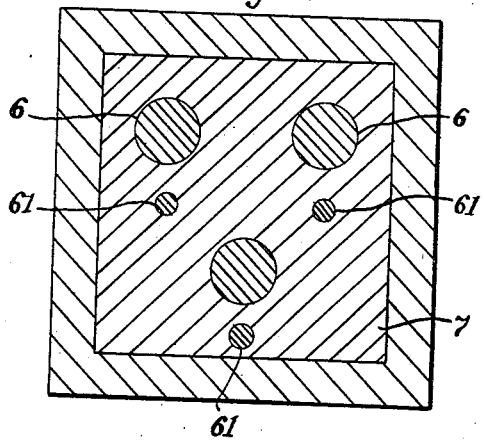
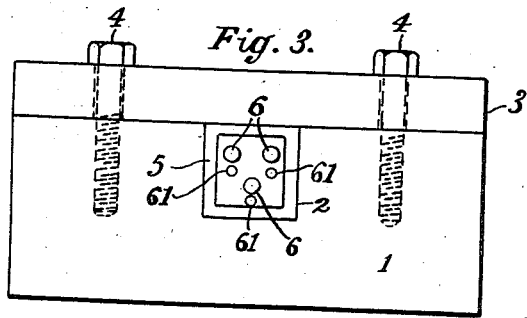

March 16, 1948.    E. ENGEL ET AL    2,437,945
PRESS TOOL
Filed July 23, 1946    2 Sheets—Sheet 2

Patented Mar. 16, 1948

2,437,945

UNITED STATES PATENT OFFICE 2,437,945

PRESS TOOL

Erich Engel, Tonteg, near Pontypridd, and Maks Salamon, Cardiff, Wales, assignors to Aero Zipp Fasteners Limited, London, England, a British company Application July 23, 1946, Serial No. 685,752
In Great Britain December 18, 1944

1 Claim. (Cl. 164—124)

This invention relates to improvements in press tools, and especially to small press tools used in the manufacture of small articles such as press-buttons, parts of watches, fastener elements for sliding clasp fasteners.

Such articles are commonly manufactured from strip stock by feeding the stock through a press where it is operated on by press tools to punch out and form the articles from the stock. It is customary to manufacture a number of these small articles simultaneously per stroke of the press, and for this purpose to employ a combination tool having a number of punches, stamps or similar tool parts. In view of the smallness of the articles, the punches or the like are correspondingly small, and in order to fix such small tool parts in the tool head of the press, it has been customary hitherto to position them in a recess in a tool head and to set them in position by a low melting point filling material or solder which is run molten into the recess and caused or allowed to set. The material commonly employed is a metal solder having a melting point below 200° C. for example in the neighborhood of 100° C. This method of fixing the tool parts in the tool head has the disadvantage that it is not easy to replace the tool parts as they become broken or worn. These very small punches or the like are subjected to considerable wear and need frequent replacement; also, some may be subjected to greater wear than others and on this account may need more frequent attention, apart from replacement due to breakages which, it may be pointed out, may occur with some of the punches or the like and not with others. Therefore, whenever the tool or any one of the punches or the like tool parts thereof needs attention or replacement, the press must be stopped and kept idle, while the filling material in the recess of the tool head is melted to enable the punches or the like to be removed from the tool head. Similar delay also occurs in resetting the punches or the like in the tool head. These delays slow production and increase costs.

To overcome its disadvantages, it has previously been proposed instead of setting the punches, stamps or similar tool parts of a press tool directly into the tool head recess as previously practiced to set the tool parts with the fusible solder or other filling material into a carrier, such as a hardened steel frame or block, which is adapted to be fitted to the tool head or in a recess of the tool head, by means, permitting the carrier with the tool parts set therein to be replaced. It is an object of the present invention to provide particularly simple and inexpensive means for easily and quickly replacing the carrier for the tool parts. The carrier may be provided with a cavity such as a recess or bore for receiving the solder or the like. Thus, when replacement is required, such as when a punch or the like is worn or breaks or a new tool is to be set up in the press, the time that the press must be idle is reduced to the minimum required to exchange one carrier and tool part assembly for another. The press is not held up for melting out the tool parts and setting them in the filling material, because with the provision of the tool carrier this work can be done away from the press, thus freeing it for production.

The invention also consists in a method of fixing tool parts to a carrier for use in a press tool, comprising the steps of inserting a portion of each tool part into one of a plurality of cavities, such as holes or recesses, in a master positioning plate so that another portion of each tool part protrudes from the respective cavity, placing a carrier having at least one cavity against the positioning plate in proper alignment thereto so that at least one protruding portion of a tool part is surrounded by the cavity in the carrier, filling the cavity in the carrier with a liquefied solder or other filling material, allowing the solder or the like to solidify, whereby to fix the tool parts to the carrier, and removing the carrier and the tool parts fixed thereto from the positioning plate.

To make the invention clearly understood, reference will now be made to the accompanying drawings which are somewhat diagrammatical and are given by way of example only, and in which:

Fig. 1 is a side view of a first embodiment of a tool carrier carrying three punches and three stamps;

Fig. 2 is a section along the line II—II of Fig. 1;

Fig. 3 is a plan view of a tool head with the tool carrier illustrated in Figs. 1 and 2 attached thereto;

In all the figures, the same parts are indicated by the same reference numerals.

Figure 4:
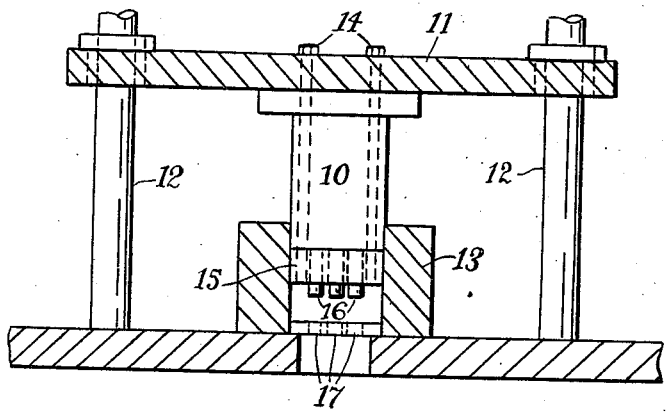
Fig. 4 illustrates another embodiment of the invention, the tool carrier being provided with three tool parts.

Referring first to Figs. 1 to 3, a tool head 1 is formed with a recess 2 therein which is closed by a bridge plate 3 screwed to the main body of the tool head by screws 4. A tool carrier block 5 fits into the recess 2 and is held therein by the bridge plate 3. A plurality of punches 6 and stamps 61 (three in the drawings) are set with fusible solder or other filling material 7 into the recessed carrier block 5. With the arrangement illustrated, an easy and rapid exchangeability of the tool carrier 5 and assembly of punches 6 and stamps 61 is achieved.

Fig. 4 illustrates a press tool having a tool head 10 attached to a support or upper part of a die-set 11 adapted to be moved up and down in any suitable known manner. The support 11 is guided by guide-bars 12, and the tool head 10 is guided in a chamber 13. By means of screws 14 extending through the tool head 10, a tool carrier 15 is releasably attached to the tool head 10. To the tool carrier 15, the tool parts 16 are attached by means of a fusible solder or other filling material, the tool parts 16 co-operating with complementary matrices 17. It will be recognized that, again, an easy and rapid exchangeability of the tool carrier 15 and the assembly of tool parts 16 is achieved.

Figure 5:
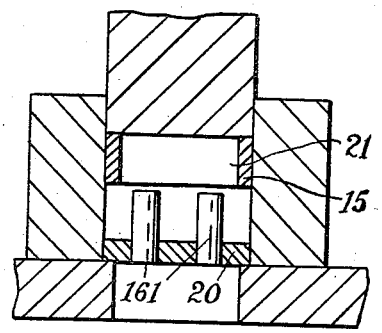
Figs. 5, 6, and 7 illustrate the manner in which the tool parts may be attached to the carrier, only two tool parts being shown for simplicity.
Figure 6:
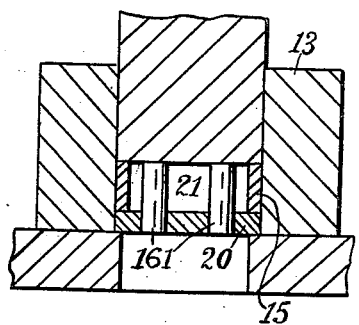
Figure 7:
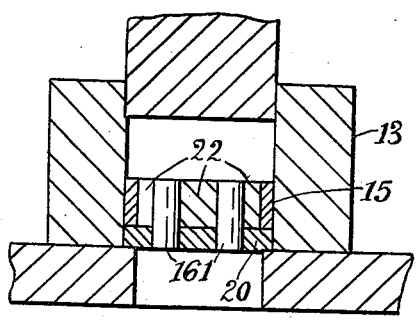

In order to secure accurate positioning of the tool parts in the carrier when fixing them thereto, a positioning plate 20 (see Figs. 5, 6, and 7) is inserted in the chamber 13 of the press-tool (or preferably, of an additional press-tool reserved for this purpose), the plate being provided with cavities for holding the tool parts 16 upright in their exact working position. The carrier 15 consists of a hardened steel frame defining a hole 21 therein and is placed on the positioning plate 20 so that the hole 21 in the frame surrounds the tool parts 161, the frame being correctly positioned relatively to the tool parts 161 by the chamber 13 (see Fig. 6). Subsequently, the solder or the like material is, while heated and liquid, poured into the hole 21 of the carrier 15 so as to surround the shanks of the tool parts 161 and, thus, to secure the tool parts 161 to the carrier 15 when the solder or the like has solidified, whereupon the carrier 15 with the assembly of tool parts 161 fixed thereto by the solder 22 is removed from the chamber 13, is, if desired, smoothed at its upper surface and is ready for attachment to the tool head 10 of the press.

While the invention is particularly useful in the manufacture of press buttons, parts of watches, fastener elements for sliding clasp fasteners, it will be apparent that it has application also to other manufactures where somewhat similar problems may arise owing to the employment of small tools.

It should be clearly understood that we do not wish our invention to be limited to the specific embodiments illustrated in the accompanying drawings, since many modifications, omissions and additions are possible and may readily occur to those skilled in the art, without departure from the scope and spirit of our invention.

We claim:

A press tool comprising a plurality of tool parts, a carrier, the said tool parts being set into said carrier by a fusible filling material, a tool head provided with a recess for receiving said carrier, a bridge plate, and means for releasably attaching said bridge plate to said tool head to close the recess in said tool head and thereby to clamp the said carrier to said tool head whereby the said carrier with the tool parts set therein is easily and quickly replaceable.

ERICH ENGEL.
MAKS SALAMON.

REFERENCES CITED

The following references are of record in the file of this patent:

UNITED STATES PATENTS

| Number | Name | Date |
|---|---|---|
| 409,324 | Hill | Aug. 20, 1889 |
| 433,003 | Hill | July 29, 1890 |
| 454,618 | Gaiger | June 23, 1891 |
| 486,858 | Cummins | Nov. 29, 1892 |
| 1,070,887 | Hartog | Aug. 19, 1913 |
| 1,997,292 | Boker | Apr. 9, 1935 |
| 2,395,082 | Wilson | Feb. 19, 1946 |
| 2,395,083 | Wilson | Feb. 19, 1946 |

OTHER REFERENCES

Cerromatrix Manual (40 Wall St., New York, N. Y.)